United States Patent
Kurimura et al.

(10) Patent No.: US 9,061,485 B2
(45) Date of Patent: Jun. 23, 2015

(54) METHOD OF MANUFACTURING TRANSLUCENT RIGID SUBSTRATE LAMINATE

(75) Inventors: Hiroyuki Kurimura, Shibukawa (JP); Tomoyuki Kanai, Shibukawa (JP); Isamu Ichikawa, Shibukawa (JP); Gosuke Nakajima, Shibukawa (JP); Hayato Miyazaki, Shibukawa (JP); Yasunori Hayashi, Shibukawa (JP); Kenji Tanaka, Shibukawa (JP)

(73) Assignee: DENKI KAGAKU KOGYO KABUSHIKI KAISHA, Tokyo (JP)

( * ) Notice: Subject to any disclaimer, the term of this patent is extended or adjusted under 35 U.S.C. 154(b) by 170 days.

(21) Appl. No.: 13/703,858

(22) PCT Filed: Jun. 1, 2011

(86) PCT No.: PCT/JP2011/062619
§ 371 (c)(1),
(2), (4) Date: Dec. 12, 2012

(87) PCT Pub. No.: WO2011/158652
PCT Pub. Date: Dec. 22, 2011

(65) Prior Publication Data
US 2013/0081752 A1 Apr. 4, 2013

(30) Foreign Application Priority Data
Jun. 15, 2010 (JP) .................. 2010-136466

(51) Int. Cl.
*B32B 37/02* (2006.01)
*B32B 17/10* (2006.01)

(52) U.S. Cl.
CPC .......... *B32B 37/02* (2013.01); *Y10T 156/1044* (2015.01); *B32B 17/10036* (2013.01); *B32B 17/10706* (2013.01); *B32B 17/10816* (2013.01)

(58) Field of Classification Search
CPC .............. B32B 37/02; B32B 17/10816; B32B 17/10036; B32B 17/10706
USPC .............................. 156/64, 272.2, 273.7, 222
See application file for complete search history.

(56) References Cited

U.S. PATENT DOCUMENTS 5,624,521 A 4/1997 Hed
6,004,413 A * 12/1999 Couttenier ............... 156/99
(Continued)

FOREIGN PATENT DOCUMENTS

JP 60-199646 10/1985
JP 02-22150 1/1990
(Continued)

OTHER PUBLICATIONS

International Preliminary Report on Patentability dated Aug. 16, 2012, issued in corresponding International Patent Application No. PCT/JP2011/050461.
(Continued)

*Primary Examiner* — Daniel McNally
(74) *Attorney, Agent, or Firm* — Stein IP, LLC

(57) ABSTRACT

Provided is a method for manufacturing a translucent rigid substrate laminate which can improve a thickness precision while decreasing the risk of fractures. In the method for manufacturing a translucent rigid substrate laminate according to the present invention, translucent rigid substrates are placed opposite to each other such that bonding surfaces thereof are parallel to each other, both rigid substrates are brought toward each other while being kept parallel, the both rigid substrates are preliminarily bonded using a photo-curable fixing agent, the bonded translucent rigid substrates are roll-pressed, and the fixing agent is then cured.

15 Claims, 11 Drawing Sheets

(56) References Cited

U.S. PATENT DOCUMENTS

| | | | |
|---|---|---|---|
| 6,309,485 B1 * | 10/2001 | Miyamoto et al. | 156/64 |
| 6,475,292 B1 | 11/2002 | Sahbari | |
| 6,627,309 B2 | 9/2003 | Stebbings et al. | |
| 6,740,190 B2 * | 5/2004 | Takase | 156/267 |
| 2001/0046644 A1 * | 11/2001 | Ukachi et al. | 430/281.1 |
| 2002/0062787 A1 | 5/2002 | Hashizume et al. | |
| 2003/0205333 A1 * | 11/2003 | Hayafuji et al. | 156/580 |
| 2004/0094264 A1 * | 5/2004 | Yamaguchi et al. | 156/273.3 |
| 2009/0218034 A1 | 9/2009 | Kawabe | |
| 2012/0298285 A1 | 11/2012 | Kurimuru et al. | |
| 2013/0081752 A1 | 4/2013 | Kurimura et al. | |

FOREIGN PATENT DOCUMENTS

| | | |
|---|---|---|
| JP | 11-271782 | 10/1999 |
| JP | 2000-44292 | 2/2000 |
| JP | 2000-319043 | 11/2000 |
| JP | 2001-192246 | 7/2001 |
| JP | 2002-522340 | 7/2002 |
| JP | 2003-270606 | 9/2003 |
| JP | 2005-132692 | 5/2005 |
| JP | 2009-1478 | 1/2009 |
| JP | 2009-40617 | 2/2009 |
| JP | 2009-205065 | 9/2009 |
| JP | 2009-256125 | 11/2009 |
| JP | 2009256125 A * | 11/2009 |

OTHER PUBLICATIONS

International Search Report mailed Mar. 22, 2011, issued in corresponding International Patent Application No. PCT/JP2011/050464.
International Preliminary Report on Patentability dated Aug. 7, 2012, issued in corresponding International Patent Application No. PCT/JP2011/050464.
English translation of the claims of Japanese Patent Application Publication No. JP 60-199646, which was cited in the International Search Report mailed Mar. 22, 20111, issued in International Patent Application No. PCT/JP2011/050464.
International Search Report; Application No. PCT/JP2011/050461; Form PCT/ISA/210 (2 pages).
U.S. Appl. No. 13/574,510, filed Jul. 20, 2012, Hiroyuki Kurimura, Denki Kagaku Kogyo Kabushiki Kaisha.
U.S. Appl. No. 13/554,747, filed Jul. 20, 2012, Hiroyuki Kurimura, Denki Kagaku Kogyo Kabushiki Kaisha.
International Search Report for PCT/JP2011/062619, Mailing Date: Jul. 5, 2011.
PCT/IB/338 for PCT/JP2011/062619; mailed Jan. 24, 2013; 1 page.
PCT/IB/373 for PCT/JP2011/062619; issued Jan. 15, 2013; 1 page.
PCT/ISA/237 for PCT/JP2011/062619; mailed Jul. 5, 2011; 5 pages.

* cited by examiner

METHOD OF MANUFACTURING TRANSLUCENT RIGID SUBSTRATE LAMINATE

CROSS-REFERENCE TO RELATED APPLICATIONS

This application is a national stage application of PCT Application No. PCT/JP2011/062619, filed Jun. 1, 2011, which claims the benefit of Japanese Application No. 2010-136466, filed Jun. 15, 2010, in the Japanese Intellectual Property Office, the disclosures of which are incorporated herein by reference.

BACKGROUND OF THE INVENTION

1. Field of the Invention

The present invention relates to a method for manufacturing a translucent (light-transmitting) rigid substrate laminate, and particularly to a method for manufacturing a plate glass laminate for manufacturing a protection glass of a display element.

2. Description of the Related Art

Display elements such as liquid crystal displays (LCDs), organic EL displays (OELDs), electroluminescent displays (ELDs), field emission displays (FEDs), plasma displays (PDPs) and the like are used in display devices of various kinds of electronic equipment such as televisions, laptop computers, car navigation systems, electronic calculators, mobile phones, electronic schedulers and personal digital assistants (PDAs). Further, a plate glass product for protection is generally installed to face the display element in order to protect the display element. Recently, a conductive film having a predetermined pattern on the surface of the plate glass product for protection is often provided so that it serves as a touch panel.

In the plate glass product, the glass plate is processed in a size and shape that are appropriate for each display device. In order to satisfy a cost level required in the market, it is required that a large amount of plate glass products are processed with high production efficiency.

Accordingly, Japanese Patent Application Laid-Open (JP-A) No. 2009-256125 (Patent Literature 1) proposes a method for increasing production efficiency for a plate glass product. Specifically, the proposed is "a method for processing a plate glass, including: forming a material glass block (A) obtained by laminating a plurality of material plate glasses 1, and at the same time, integrally fixing each material plate glass 1 by a strippable fixing agent 2 interposed between the material plate glasses 1; forming a division glass block (B) having a small area by dividing the material glass block (A) in a surface direction; forming a product glass block (C) in a product form when viewed in a plan view by processing at least an outer boundary of the division glass block (B); and individually separating the product glass block (C) after an edge face of the product glass block (C) is processed" (claim 1). Accordingly, there is described that "since division, external shape processing and edge face processing are performed after a plurality of material plate glasses are laminated, a plurality of plate glass products may be obtained by a fewer processes and productivity is increased" (Paragraph 0007).

Further, Patent Literature 1 describes that "the fixing agent 2 interposed between the material plate glasses 1 is a photo-curable liquid fixing agent that is cured when UV is irradiated and then softened when a temperature is increased (claim 4). Accordingly, there is described that "if pressure is applied in upper and lower directions by interposing the photo-curable liquid fixing agent between the upper and lower material plate glasses, the liquid fixing agent spreads to have a constant thickness in a film form on the entire surface between the upper and lower material plate glasses, and if infrared rays are irradiated in this state, the liquid fixing agent spreading in the film form is cured to integrally fix the upper and lower plate glasses. Therefore, a plurality of material plate glasses may be rapidly laminated with high precision so as to be integrally fixed. In addition, after final processing (edge face processing), if the product glass block is accommodated in warm water and the like to increase the temperature, the fixing agent cured between the plate glasses is softened and separated in a film form. Therefore, it is easy to recover and treat the fixing agent without causing environmental pollution" (Paragraph 0007).

The paragraphs of "Best Mode for Carrying Out the Invention" of Patent Literature 1 describes that twenty material plate glasses are laminated while the photo-curable liquid fixing agent is interposed between the material plate glasses, subsequently, the fixing agent is cured by irradiating UV rays (UV light) to the upper surface of the laminated material plate glasses, and the material glass block where the upper and lower material plate glasses are integrally fixed is formed (paragraphs 0010 to 0011).

Meanwhile, as a method for bonding a plate glass with high precision, a method using a roller is known. For example, JP-A No. 2009-40617 (Patent Literature 2) describes a method for bonding a plate glass, including: bonding a base glass (G) on an object to be bonded (F) by applying pressure while an adsorbent is retracted from an adhesion position into a retraction position before an adhesion movement of an adhesion roller in the process of moving the adhesion roller from an adhesion start edge toward an adhesion end edge. Patent Literature 2 describes that the base glass G and the object to be bonded F may be always bonded properly while air is securely prevented from being interposed between the bonding faces of the both.

Further, Patent Literature 2 also describes that: the misalignment of the object to be bonded (F) and the base glass (G) is optically detected by a misalignment detection device, and the objected to be bonded (F) and the base glass (G) are positioned by a position adjustment device; an adhesive layer covered with a release paper is formed on one face of the object to be bonded, and the release paper is delaminated during the bonding; the adhesive layer may be formed of an UV curing resin, and in that case, it is preferable that G and F are bonded by a bonding apparatus described in Patent Literature 2, and then the adhesive layer is subjected to curing treatment; and the like.

CITATION LIST

Patent Literature

Patent Literature 1: JP-A No. 2009-256125
Patent Literature 2: JP-A No. 2009-40617

SUMMARY OF THE INVENTION

According to a method for processing a plate glass described in Patent Literature 1, it is possible to manufacture a plate glass product having a predetermined shape with high production efficiency. However, some of electronic equipment requires that a desired printing pattern (for example, a design of a display screen of a mobile phone) is formed on a plate glass. In this case, a high positional precision with respect to the pattern to be printed is required (for example, an allowable error is about 10 to 30 μm).

In the method described in Patent Literature 1, twenty material plate glasses are laminated while the photo-curable liquid fixing agent is interposed between the material plate glasses, subsequently, the fixing agent is cured by irradiating UV rays (UV light) to the upper surface of the laminated material plate glasses, and the material glass block where the upper and lower material plate glasses are integrally fixed is formed. However, it is difficult to obtain high thickness precision according to the procedure. Further, since the fixing agent is not cured while the material plate glasses are laminated and slight misalignment easily occurs between the glass surfaces, the procedure is not suitable for alignment with high precision. That is, it is difficult to obtain high positional precision in the method described in Patent Literature 1.

In the method described in Patent Literature 2, the plate glasses to be bonded are positioned, and then both are bonded by applying pressure with a bonding roller. Although Patent Literature 2 describes that the plate glasses may be formed using a UV curable resin as an adhesive, the UV curable resin before curing is a liquid and has fluidity, and thus there is a concern that plate glasses may not be bonded with high thickness precision. When the thickness precision is insufficient, a glass 51 laminated by interposing a fixing agent is distorted (see FIG. 18), thereby resulting in easily getting out of a forming device during the shape processing, reducing processing precision, or the like. In addition, in the method described in Patent Literature 2, it is necessary to curve the glass, and thus there is a risk that the glass may be broken during the bonding. It is also likely that the plate glass may be misaligned while bonding by the roller.

Accordingly, it is an object of the present invention to provide a method for manufacturing a translucent rigid substrate laminate to improve thickness precision while decreasing the risk of fractures. Further, it is another object of the present invention to provide a method for manufacturing a plate-shaped product by using the method for manufacturing the translucent rigid substrate laminate.

The present inventors have intensively studied to solve the aforementioned problems, and found that it was effective to use a method including: placing translucent rigid substrates to face each other in a predetermined positional relationship such that bonding surfaces thereof are parallel to each other, bringing both rigid substrates toward each other while being kept in parallel, preliminarily bonding both rigid substrates using a photo-curable fixing agent, roll-pressing the bonded translucent rigid substrates, and then curing the fixing agent.

In an aspect of the present invention accomplished based on the aforementioned findings, a method for manufacturing a translucent rigid substrate laminate includes: 1) a process of preparing a first translucent rigid substrate, 2) a process of preparing a second translucent rigid substrate, 3) a process of applying a photo-curable fixing agent to a first surface of the first translucent rigid substrate and/or a first surface of the second translucent rigid substrate, 4) a process of placing the first surface of the first translucent rigid substrate and the first surface of the second translucent rigid substrate to face each other such that both surfaces are parallel to each other, 5) a process of applying pressure to the first surface of the first translucent rigid substrate and the first surface of the second translucent rigid substrate to bond both translucent rigid substrates while being kept parallel, to preliminarily adhere the both translucent rigid substrates to each other, 6) a process of roll-pressing the preliminarily adhered translucent rigid substrates, 7) after process 6) a process of irradiating light for curing the entire fixing agent interposed and spreading between the both translucent rigid substrates to form the translucent rigid substrate laminate, and 8) a process of repeating a series of processes 1) to 7) at least one time by regarding the translucent rigid substrate laminate as the first translucent rigid substrate to form the translucent rigid substrate laminate where at least three translucent rigid substrates are bonded.

In an embodiment of the method for manufacturing the translucent rigid substrate laminate according to the present invention, 5') a process of forming a provisionally fastened translucent rigid substrate laminate by irradiating light for curing only the outer boundary portion of the fixing agent interposed and spreading between the both translucent rigid substrates while maintaining the pressure is performed between processes (5) and (6), or 6') a process of forming a provisionally fastened translucent rigid substrate laminate by irradiating light for curing only the outer boundary portion of the fixing agent interposed and spreading between the both translucent rigid substrates or irradiating light having energy that is lower than energy of process 7) on the entire fixing agent is performed between processes (6) and (7).

In another embodiment of the method for manufacturing the translucent rigid substrate laminate according to the present invention, a mark for alignment is attached to the surface of each translucent rigid substrate, process (5') is performed, and the embodiment includes performing position adjustment in a surface direction while imaging the mark by an imaging device in process 4) or 5).

In yet another embodiment of the method for manufacturing the translucent rigid substrate laminate according to the present invention, a mark for alignment is attached to the surface of each translucent rigid substrate. The embodiment includes performing the process (6') as well as performing position adjustment of the preliminarily adhered translucent rigid substrate in a surface direction while imaging the mark by an imaging device between processes (6) and (6').

In yet another embodiment of the method for manufacturing the translucent rigid substrate laminate according to the present invention, an imaging device for imaging a mark for alignment of a first translucent rigid substrate from a second surface side of the first translucent rigid substrate and an imaging device for imaging a mark for alignment of a second translucent rigid substrate from a first or second surface side of the second translucent rigid substrate are provided.

In yet another embodiment of a method for manufacturing the translucent rigid substrate laminate according to the present invention, the process (7) is performed by irradiating light on the surface of the second translucent rigid substrate.

In yet another embodiment of the method for manufacturing the translucent rigid substrate laminate according to the present invention, a predetermined printing pattern and/or plating pattern for exhibiting any one of the functions of a plate-shaped product is attached to the surface of each translucent rigid substrate.

In yet another embodiment of the method for manufacturing the translucent rigid substrate laminate according to the present invention, the fixing agent includes a granular material.

In yet another embodiment of the method for manufacturing the translucent rigid substrate laminate according to the present invention, the amount of irradiation of light in the process (7) is in a range of 1,000 to 5,000 mJ/cm$^2$ when measured by a cumulative illuminometer using a light receptor of 365 nm.

In yet another embodiment of the method for manufacturing the translucent rigid substrate laminate according to the present invention, the translucent rigid substrate is a plate glass.

In yet another embodiment of the method for manufacturing the translucent rigid substrate laminate according to the present invention, light is irradiated while changing an angle of incidence in process (7).

In yet another embodiment of the method for manufacturing the translucent rigid substrate laminate according to the present invention, process (7) is performed while the translucent rigid substrate laminate is conveyed by a conveyor.

In another aspect of the present invention, a method for manufacturing a plate-shaped product includes: 9) a process of dividing the translucent rigid substrate laminate obtained by using the method for manufacturing the translucent rigid substrate laminate in a thickness direction to form the divided translucent rigid substrate laminates in a desired number, 10) a process of performing desired shape processing with respect to each of the divided translucent rigid substrate laminates, and 11) a process of heating the translucent rigid substrate laminate after the shape processing to delaminate the bonded translucent rigid substrates from each other and forming a plurality of plate-shaped products.

In an embodiment of the method for manufacturing the plate-shaped product according to the present invention, a predetermined printing pattern and/or plating pattern for exhibiting any one of the functions of a plate-shaped product is attached to the surface of each translucent rigid substrate, and the embodiment includes irradiating light for curing an uncured fixing agent toward the side surface of the divided translucent rigid substrate laminate between processes (9) and (11).

In another embodiment of the method for manufacturing the plate-shaped product according to the present invention, process (11) includes immersing the translucent rigid substrate laminate after the shape processing in warm water to soften the fixing agent in a film form.

According to the present invention, it is possible to manufacture a translucent rigid substrate laminate with high thickness precision while decreasing the risk of fractures. Therefore, it is possible to industrially manufacture plate-shaped products with high dimensional precision. The present invention may be appropriately used in, for example, a method for mass-producing a protection glass including a glass for touch panel of a display device.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 16-1 is an example of a schematic view illustrating the positional relationship of an imaging device.

FIG. 16-2 is another example of a schematic view illustrating the positional relationship of the imaging device.

DETAILED DESCRIPTION OF THE EMBODIMENTS

Figure 1:
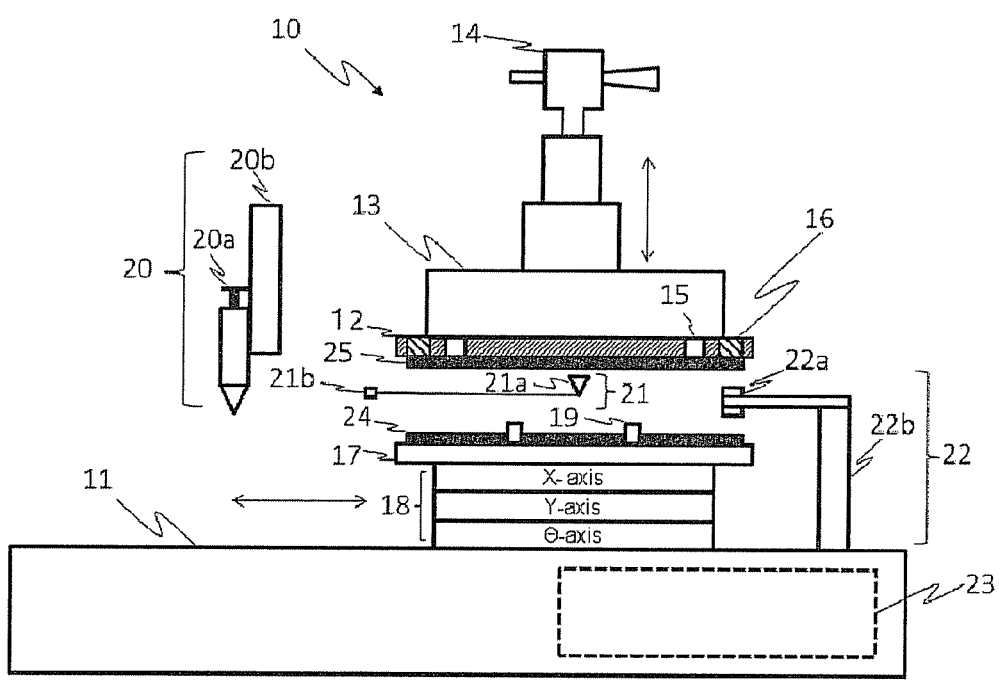
FIG. 1 is a schematic view illustrating a first example of a substrate bonding apparatus for preliminarily adhering translucent rigid substrates to each other.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In an embodiment of the method for manufacturing the translucent rigid substrate laminate according to the present invention, the following processes are performed: 1) a process of preparing a first translucent rigid substrate, 2) a process of preparing a second translucent rigid substrate, 3) a process of applying a photo-curable fixing agent to a first surface of the first translucent rigid substrate and/or a first surface of the second translucent rigid substrate, 4) a process of placing the first surface of the first translucent rigid substrate and the first surface of the second translucent rigid substrate to face each other such that both surfaces are parallel to each other, 5) a process of applying pressure to the first surface of the first translucent rigid substrate and the first surface of the second translucent rigid substrate to bond both translucent rigid substrates while being kept parallel, to preliminarily adhere the both translucent rigid substrates to each other, 6) a process of roll-pressing the preliminarily adhered translucent rigid substrates, 7) after process 6) a process of irradiating light for curing the entire fixing agent interposed and spreading between the both translucent rigid substrates to form the translucent rigid substrate laminate, and 8) a process of repeating a series of processes 1) to 7) at least one time by regarding the translucent rigid substrate laminate as the first translucent rigid substrate to form the translucent rigid substrate laminate where at least three translucent rigid substrates are bonded.

In processes (1) and (2), the translucent rigid substrate that is a target to be processed is prepared. The translucent rigid substrate is not particularly limited, but examples thereof may include a plate glass (a material plate glass, a transparent conductive film-attached glass substrate, a glass substrate on which an electrode or a circuit is formed and the like), a sapphire substrate, a quartz substrate, a plastic substrate, a magnesium fluoride substrate and the like. Examples of glass may also include reinforced glass. The size of the translucent rigid substrate is not particularly limited, but the translucent rigid substrate typically has an area of about 10,000 to 250,000 mm$^2$ and a thickness of about 0.1 to 2 mm. Generally, each of the translucent rigid substrates has the same size. Though not restrictive, a predetermined printing pattern or plating pattern for exhibiting any one of the functions of the plate-shaped product may be attached to the surface of each translucent rigid substrate. Examples of the printing pattern may include a design of a display screen of a mobile phone, and examples of the plating pattern may include a rotary encoder where a metal wiring pattern such as Al and AlNd or a chrome plating pattern is formed.

In process (3), a photo-curable fixing agent is applied to the first surface of the first translucent rigid substrate and/or the first surface of the second translucent rigid substrate. The photo-curable fixing agent is a fixing agent that is cured by irradiating light such as UV rays and softened by heating at high temperatures, and various kinds of fixing agents are known. Any known photo-curable fixing agents may be used in the present invention, and the photo-curable fixing agent is not particularly limited. The photo-curable fixing agent may be applied to a bonding surface of either one of the translucent rigid substrates, but is preferably applied to the bonding surfaces of the both translucent rigid substrates in view of improvement in adhesion property.

Examples of the photo-curable fixing agent appropriately used in the present invention may include, as described in WO 2008/018252, an adhesive composition including (A) polyfunctional (meth)acrylate, (B) monofunctional (meth)acrylate and (C) a photopolymerization initiator.

As (A) polyfunctional (meth)acrylate, polyfunctional (meth)acrylate oligomer/polymers having two or more (meth)acryloyl groups at an end or side chain of the oligomer/polymer, and polyfunctional (meth)acrylate monomers having two or more (meth)acryloyl groups may be used. Examples of the polyfunctional (meth)acrylate oligomer/polymer may include 1,2-polybutadiene terminated urethane (meth)acrylate (for example, "TE-2000" and "TEA-1000" manufactured by Nippon Soda Co., Ltd.), a hydrogenated product thereof (for example, "TEAI-1000" manufactured by Nippon Soda Co., Ltd.), 1,4-polybutadiene terminated urethane (meth)acrylate (for example, "BAC-45" manufactured by Osaka Organic Chemical Industry Ltd.), polyisoprene terminated (meth)acrylate and polyester-based urethane (meth)acrylate (for example, "UV-2000B", "UV-3000B" and "UV-7000B" manufactured by The Nippon Synthetic Chemical Industry Co., Ltd., and "KHP-11" and "KHP-17" manufactured by Negami Chemical Industrial Co., Ltd.), polyether-based urethane (meth)acrylate (for example, "UV-3700B" and "UV-6100B" manufactured by The Nippon Synthetic Chemical Industry Co., Ltd.), bisphenol A type epoxy (meth)acrylate or the like. Among them, polyester-based urethane (meth)acrylate is preferable.

Examples of the bifunctional (meth)acrylate monomer may include 1,3-butylene glycol di(meth)acrylate, 1,4-butandiol di(meth)acrylate, 1,6-hexanediol di(meth)acrylate, 1,9-nonanediol di(meth)acrylate, neopentylglycol di(meth)acrylate, dicyclopentanyl di(meth)acrylate, 2-ethyl-2-butyl-propandiol di(meth)acrylate, neopentyl glycol-modified trimethylolpropane di(meth)acrylate, stearic acid-modified pentaerythritol di(meth)acrylate, polypropylene glycol di(meth)acrylate, 2,2-bis(4-(meth)acryloxydiethoxyphenyl)propane, 2,2-bis(4-(meth)acryloxypropoxyphenyl)propane, 2,2-bis(4-(meth)acryloxytetraethoxyphenyl)propane or the like. Examples of the trifunctional (meth)acrylate monomer may include trimethylolpropane tri(meth)acrylate, tris[(meth)acryloxyethyl] isocyanurate and the like. Examples of tetrafunctional or more (meth)acrylate monomer may include dimethylolpropane tetra(meth)acrylate, pentaerythritol tetra(meth)acrylate, pentaerythritolethoxy tetra(meth)acrylate, dipentaerythritol penta(meth)acrylate, dipentaerythritol hexa(meth)acrylate or the like. Among them, dicyclopentanyl di(meth)acrylate is preferable.

Among (A), one or more kinds of the group consisting of polyfunctional (meth)acrylate oligomer/polymer and bifunctional (meth)acrylate monomer are preferable, and a combined use of polyfunctional (meth)acrylate oligomer/polymer and bifunctional (meth)acrylate monomer is more preferable. When polyfunctional (meth)acrylate oligomer/polymer and bifunctional (meth)acrylate monomer are used in combination, the mixing ratio thereof is preferably polyfunctional (meth)acrylate oligomer/polymer:bifunctional (meth)acrylate monomer=10 to 90:90 to 10 and more preferably 30 to 70:70 to 30 as a mass ratio, based on 100 parts by mass of the total content of the polyfunctional (meth)acrylate oligomer/polymer and bifunctional (meth)acrylate monomer.

Examples of (B) the monofunctional (meth)acrylate monomer may include methyl (meth)acrylate, ethyl (meth)acrylate, propyl (meth)acrylate, butyl (meth)acrylate, 2-ethyl hexyl (meth)acrylate, isooctyl (meth)acrylate, isodecyl (meth)acrylate, lauryl (meth)acrylate, stearyl (meth)acrylate, phenyl (meth)acrylate, cyclohexyl (meth)acrylate, dicyclopentanyl (meth)acrylate, dicyclopentenyl (meth)acrylate, dicyclopentenyloxyethyl (meth)acrylate, isobornyl (meth)acrylate, methoxylated cyclodecatriene (meth)acrylate, 2-hydroxyethyl (meth)acrylate, 2-hydroxypropyl (meth)acrylate, 3-hydroxypropyl (meth)acrylate, 4-hydroxybutyl (meth)acrylate, tetrahydrofurfuryl (meth)acrylate, 2-hydroxy-3-phenoxypropyl (meth)acrylate, glycidyl (meth)acrylate, caprolacton-modified tetrahydrofurfuryl (meth)acrylate, 3-chloro-2-hydroxypropyl (meth)acrylate, N,N-dimethylaminoethyl (meth)acrylate, N,N-diethylaminoethyl (meth)acrylate, t-butylaminoethyl (meth)acrylate, ethoxycarbonylmethyl (meth)acrylate, phenolethylene oxide-modified (meth)acrylate, phenol (2 mol ethylene oxide-modified) (meth)acrylate, phenol (4 mol ethylene oxide-modified) (meth)acrylate, paracumylphenol ethylene oxide-modified (meth)acrylate, nonylphenol ethylene oxide-modified (meth)acrylate, nonylphenol (4 mol ethylene oxide-modified) (meth)acrylate, nonylphenol (8 mol ethylene oxide-modified) (meth)acrylate, nonylphenol (2.5 mol propylene oxide-modified) (meth)acrylate, 2-ethylhexylcarbitol (meth)acrylate, ethylene oxide-modified phthalic acid (meth)acrylate, ethylene oxide-modified succinic acid (meth)acrylate, trifluoroethyl (meth)acrylate, acrylic acid, methacrylic acid, maleic acid, fumaric acid, ω-carboxy-polycaprolacton mono (meth)acrylate, phthalic acid monohydroxyethyl (meth)acrylate, (meth)acrylic acid dimer, β-(meth)acryloyloxyethyl hydrogen succinate, n-(meth)acryloyl oxyalkylhexahydrophthalimide, 2-(1,2-cyclohexacarboxyimide)ethyl (meth)acrylate, ethoxydiethyleneglycol (meth)acrylate, benzyl (meth)acrylate and the like.

Among (B), one or more kinds of the group consisting of phenol (2 mol ethylene oxide-modified) (meth)acrylate, 2-(1,2-cyclohexacarboxyimide)ethyl (meth)acrylate, and 2-hydroxy-3-phenoxypropyl (meth)acrylate are preferable, and a combined use of phenol (2 mol ethylene oxide-modified) (meth)acrylate with 2-(1,2-cyclohexacarboxyimide)ethyl (meth)acrylate and/or 2-hydroxy-3-phenoxypropyl (meth)acrylate is more preferable. When phenol (2 mol ethylene oxide-modified) (meth)acrylate is used in combination with 2-(1,2-cyclohexacarboxyimide)ethyl (meth)acrylate and/or 2-hydroxy-3-phenoxypropyl (meth)acrylate, the mixing ratio thereof is preferably phenol (2 mol ethylene oxide-modified) (meth)acrylate: 2-(1,2-cyclohexacarboxyimide)ethyl (meth)acrylate and/or 2-hydroxy-3-phenoxypropyl (meth)acrylate=10 to 90:90 to 10 and more preferably 30 to 45:70 to 55 as a mass ratio, based on 100 parts by mass of the total content of phenol (2 mol ethylene oxide-modified) (meth)acrylate, 2-(1,2-cyclohexacarboxyimide)ethyl (meth)acrylate and/or 2-hydroxy-3-phenoxypropyl (meth)acrylate.

A mixing ratio of (A) polyfunctional (meth)acrylate and (B) monofunctional (meth)acrylate is preferably (A):(B)=5:95 to 95:5 (parts by mass). If (A) polyfunctional (meth)acrylate is 5 parts by mass or more, there is no worry of a reduction in initial adhesion property. If (A) polyfunctional (meth)acrylate is 95 parts by mass or less, a delaminating property may be ensured. The cured fixing agent is delaminated in a film form by being immersed in warm water. The content of (B) monofunctional (meth)acrylate is more preferably 40 to 80 parts by mass based on 100 parts by mass of the total content of (A) and (B).

(C) The photopolymerization initiator is mixed to promote photocuring of the resin composition by being sensitized by visible rays or active rays of UV rays, and various kinds of known photopolymerization initiators may be used. Specific examples thereof may include benzophenone or a derivative thereof; benzyl or a derivative thereof; anthraquinone or a derivative thereof; benzoin; a benzoin derivative such as benzoinmethylether, benzoinethylether, benzoinpropylether, benzoinisobutylether, benzyldimethylketal, and the like; an acetophenone derivative such as diethoxy acetophenone, 4-t-butyltrichloroacetophenone, and the like; 2-dimethylaminoethylbenzoate; p-dimethylaminoethylbenzoate; diphenyl disulfide; thioxanthone or a derivative thereof; camphorquinone; a camphorquinone derivative such as 7,7-dimethyl-2,3-dioxobicyclo [2.2.1]heptane-1-carboxylic acid, 7,7-dimethyl-2,3-dioxobicyclo [2.2.1]heptane-1-carboxy-2-bromoethylester, 7,7-dimethyl-2,3-dioxobicyclo [2.2.1]heptane-1-carboxy-2-methylester, 7,7-dimethyl-2,3-dioxobicyclo [2.2.1]heptane-1-carboxylic acid chloride, and the like; a α-aminoalkylphenone derivative such as 2-methyl-1-[4-(methylthio)phenyl]-2-morpholinopropan-1-on, 2-benzyl-2-dimethyl amino-1-(4-morpholinophenyl)-butanone-1, and the like; an acylphosphine oxide derivative such as benzoyldiphenylphosphine oxide, 2,4,6-trimethylbenzoyldiphenylphosphine oxide, benzoyldiethoxyphosphine oxide, 2,4,6-trimethyl benzoyl dimethoxyphenylphosphine oxide, 2,4,6-trimethyl benzoyl diethoxyphenylphosphine oxide, and the like; oxy-phenyl-acetic acid 2-[2-oxo-2-phenyl-acetoxy-ethoxy]-ethyl ester, oxy-phenyl-acetic acid 2-[2-hydroxy-ethoxy]-ethyl ester, and the like. The photopolymerization initiator may be used alone or in combination of two or more kinds thereof. Among them, in view of a large effect, it is preferable to use one or two or more kinds of the group consisting of benzyldimethylketal, oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester.

The content of (C) the photopolymerization initiator is preferably 0.1 to 20 parts by mass and more preferably 0.5 to 15 parts by mass based on 100 parts by mass of the total content of (A) and (B). If the content is 0.1 parts by mass or more, a curing promotion effect may be definitely obtained. If the content is 20 parts by mass or less, a sufficient curing speed may be obtained. Addition of component (C) in a content of 1 part by mass or more is more preferable in that curing can be performed irrespective of the amount of irradiation of light, and the degree of crosslinking of a cured body of the composition is increased, suppressing misalignment and the like during cutting processing and improving a delaminating property.

It is preferable that the photo-curable fixing agent includes a granular material (D) that is not dissolved in components (A), (B) and (C) of the fixing agent. Therefore, the composition after curing may be maintained in a constant thickness, and thus a process precision is improved. Further, from the viewpoint that line expansion coefficients of the cured body of the adhesive composition and the granular material (D) are different from each other, a delaminating property is improved when delaminating is performed after the translucent rigid substrate is bonded by using the adhesive composition.

Any one of generally used organic particles or inorganic particles may be used as the material of the granular material (D). Specifically, examples of the organic particles may include polyethylene particles, polypropylene particles, crosslinked polymethylmethacrylate particles, crosslinked polystyrene particles and the like. Examples of the inorganic particles may include ceramic particles such as glass, silica, alumina, titanium and the like. Among them, organic particles are preferable, and one or more kinds selected from the group consisting of crosslinked polymethylmethacrylate particles and crosslinked polystyrene particles are more preferable.

It is preferable that the granular material (D) has a sphere shape in view of improvement of processing precision, that is, control of the film thickness of the fixing agent. It is preferable that an average particle size of the granular material (D) by a laser method is in the range of 20 to 200 μm. If the average particle size of the granular material is 20 μm or more, a delaminating property is excellent, and if the average particle size is 200 μm or less, misalignment does not easily occur when a provisionally fixed member is processed and a dimensional precision is excellent. In view of the delaminating property and the dimensional precision, the average particle size (D50) is preferably 35 μm to 150 μm and more preferably 50 μm to 120 μm. A particle size distribution is measured by a laser diffraction type particle size distribution measurement device.

The amount of the granular material (D) used, in view of adhesion property, processing precision and delaminating property, is preferably 0.01 to 20 parts by mass, more preferably 0.1 to 10 parts by mass, and most preferably 0.2 to 6 parts by mass based on 100 parts by mass of the total amount of (A) and (B).

In process (4), the first surface of the first translucent rigid substrate and the first surface of the second translucent rigid substrate are placed to face each other such that both surfaces are parallel to each other. Generally, both translucent rigid substrates face each other such that both translucent rigid substrates are under a predetermined positional relationship in a surface direction. For example, they are placed so as to precisely overlap each other. A guide rail, abutting bar or frame for moving the translucent rigid substrate to a certain position by restricting a movement direction of the translucent rigid substrate may be considered as means for implementing the facing. In the case where position determination having a higher precision is required, it is preferable to perform the position determination by a bonding apparatus having a position determination mechanism. It is more preferable to attach a mark for alignment to the surface of each translucent rigid substrate and to use a bonding apparatus that can perform position adjustment while imaging the mark by an imaging device in order to perform position determination with high precision. When the position determination with high precision is performed, it is preferable to perform process (5') to be described below in order to prevent the misalignment from occurring during roll pressing. In addition, misalignment may be corrected after both translucent rigid substrates are bonded, but the fixing agent may leak from a bonding surface or scratches may be formed on the surface of the substrate, and thus, it is preferable to correct misalignment before bonding.

Figures 1, 16:
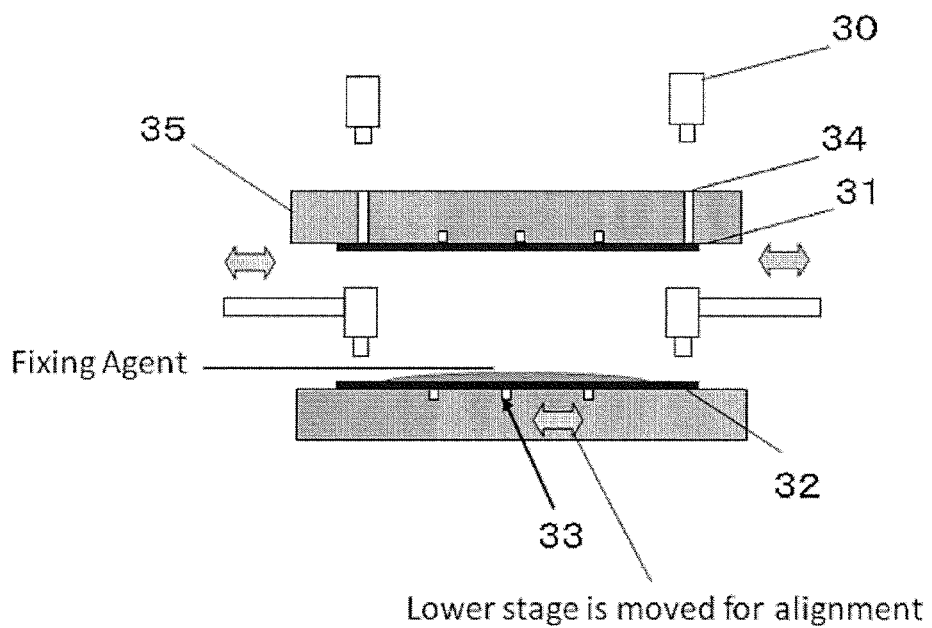
Figures 2, 16:
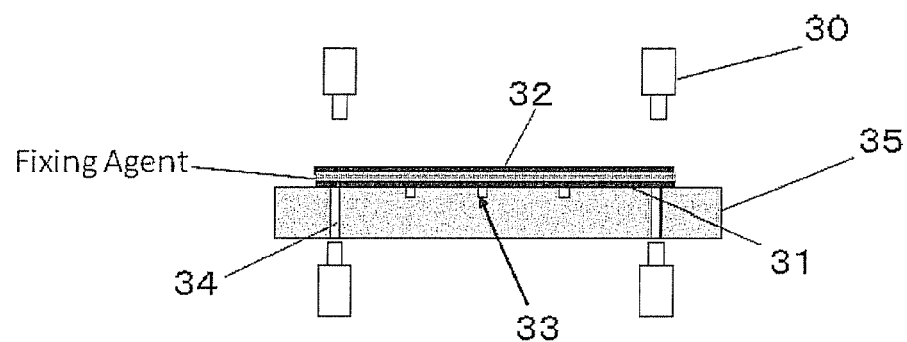

The imaging device is preferably installed on the second surface side of the first translucent rigid substrate and on the first or second surface side of the second translucent rigid substrate. FIG. 16-1 illustrates a state where an imaging device 30 is imaging a mark for alignment which is attached to the surface of each of a first translucent rigid substrate 31 and a second translucent rigid substrate 32, which are adsorbed on a stage 35 with adsorption holes 33. The alignment is performed by moving the stage 35 in a lower position. Here, the imaging device for imaging the second translucent rigid substrate 32 is installed on the bonding surface side (first surface) of the second translucent rigid substrate 32 and is movable such that the bonding is not disturbed. However, the imaging device may be installed on the surface (second surface) side opposite to the bonding surface of the second translucent rigid substrate 32. Holes 34 for imaging may be formed in the stage 35 if necessary. If the imaging device is installed in this manner, even when a plurality of translucent rigid substrates is laminated, the position adjustment of a newly bonded translucent rigid substrate (that is, the second translucent rigid substrate) can be necessarily performed based on the bottom layer translucent rigid substrate (when the lamination is repeated, the surface opposite to the bonding surface of the bottom layer translucent rigid substrate becomes the second surface of the first translucent rigid substrate), and thus it is possible to laminate the translucent rigid substrate with higher position precision than the adjustment performed by imaging the bonding surfaces.

In process (5), bonding is performed by applying pressure to the first surface of the first translucent rigid substrate and the first surface of the second translucent rigid substrate while maintaining the parallel state determined in process (4), and the both translucent rigid substrates are preliminarily adhered to each other. In view of using a photo-curable fixing agent, the both substrates are not completely adhered to each other only by applying pressure. In this sense, the adhesion herein was defined as "preliminary adhesion". In the preliminary adhesion process, a substrate with the uniformity of the thickness achieved may be obtained by bonding substrates in parallel, and thus roll-pressing is performed thereon to improve the thickness precision after the roll-pressing. If the thickness precision is improved, problems during the shape processing are also reduced. If only a roll-pressing is performed without the preliminarily adhesion, the non-uniformity easily occurs in the thickness of the fixing agent.

Further, when a preliminary adhesion is not performed, the substrate is significantly misaligned during roll-pressing, or a fixing agent does not widely spread on the entire surface depending on the application pattern of the fixing agent. Glasses are brought into contact with each other on a portion where the fixing agent does not widely spread to form scratches and also a portion which is not adhered occurs. The portion which is not adhered causes chipping, fractures or the like during the shape processing, resulting in the decrease in productivity. However, when the preliminary adhesion is performed, the fixing agent easily spreads widely on the entire bonding surface during roll-pressing irrespective of the application pattern of the fixing agent, and it is possible to reduce these problems.

In view of the lamination precision, it is preferable that the fixing agent spreads in a constant thickness on the entire bonding surface. If the amount of the applied fixing agent is excessively small, the fixing agent does not spread on the entire bonding surface, thereby causing generation of bubbles on the bonding surface. If bubbles are generated, the position precision is reduced. If the amount of the applied fixing agent is excessively large, the fixing agent leaks from a gap of the bonding surface. Even if the fixing agent slightly leaks, the fixing agent may be wiped and leakage is not a big problem. However, if the amount is large, the fixing agent is wasted.

Pressure during bonding also affects the spreading of the fixing agent. Accordingly, it is required that the bonding pressure is appropriately adjusted in addition to the amount of the fixing agent. A method for using a bonding apparatus having a function of controlling pressure when the translucent rigid substrates are bonded to each other may be considered as a means for implementing the adjustment.

Specific pressure or time during the bonding may be appropriately set in consideration of the aforementioned matters, and, for example, the pressure may be 10 to 800 $g/cm^2$ and typically 100 to 700 $g/cm^2$, and the time is 10 seconds to 5 minutes and typically 1 to 4 minutes. At this time, heating may be performed. However, there is a concern that the substrate is warped due to internal stress when heating is performed, and thus it is preferable that heating is not performed.

In increasing the lamination precision, controlling the thickness of the fixing agent itself is also considered. As the method for controlling the thickness, a method for using a bonding apparatus having a function of controlling a height of the translucent rigid substrate when the translucent rigid substrates are bonded to each other is considered, in addition to the method for mixing a granular material with the fixing agent as described above.

In the case where there is a waiting time until transition is performed from process (5) to process (6) or the case where process (6) is performed at a position that is apart from a performing position of process (5), it is considered that the translucent rigid substrate is stored in a predetermined storage place or transferred to an irradiation device. In this case, it is required that misalignment of the substrates during transfer or leakage of the fixing agent during storage be prevented. Therefore, process (5') of forming a provisionally fastened translucent rigid substrate laminate by irradiating light for curing only an outer boundary portion of the fixing agent interposed and spreading between both translucent rigid substrates while maintaining pressure applied in process (5) may be performed between processes (5) and (6). Only the outer boundary portion of the fixing agent is cured in an annular shape by irradiating light to the outer boundary portion of the fixing agent, and both translucent rigid substrates may be bonded with a relatively weak force. The provisional fastening is helpful even in preventing the misalignment of the substrate during roll-pressing.

Since energy of light required in provisional fastening may be significantly small as compared to light required to cure the entire fixing agent, simple lighting devices such as a black light or the like are sufficient. Accordingly, it is possible to increase the lamination precision while considering safety of a worker. In view of the purpose that misalignment of the bonded translucent rigid substrates does not easily occur, the outer boundary portion may be a region having a certain width. However, if light is irradiated excessively inside, the purpose of provisional fastening for merely preventing misalignment is impaired and simultaneously the time for irradiation is elongated, thereby reducing production efficiency. Typically, the outer boundary portion to which light is irradiated for provisional fastening is 5 to 25 mm, and more typically 7 to 17 mm in width. Further, it is preferable that the outer boundary portion to which light is irradiated is present on a marginal region which does not form a portion of a plate-shaped product. It is thus possible to uniformalize the light irradiation history of a portion forming the plate-shaped product when light is irradiated on the entire fixing agent, and the distortion of the fixing agent is suppressed. As a result, distortion of the substrate of the corresponding portion may also be suppressed.

A wavelength of light irradiated for the purpose of provisional fastening may be appropriately changed according to a property of the fixing agent to be used, and for example, microwaves, infrared rays, visible rays. UV rays, X-rays, γ-rays, electron beams and the like may be irradiated. Generally, irradiation light is UV rays because UV rays may be simply used and has relatively high energy. Therefore, in the present invention, light refers not only to visible rays but also to electromagnetic waves (energy rays) covering a wide wavelength region.

Light irradiated for the purpose of provisional fastening may be irradiated in an amount required to provisionally fasten the translucent rigid substrates. When the amount is measured by a cumulative illuminometer using a light receptor of 365 nm, the amount may be generally 1 to 500 mJ/cm$^2$, typically 3 to 300 mJ/cm$^2$, and more typically 5 to 500 mJ/cm$^2$. The irradiation time is generally 1 to 120 seconds, typically 2 to 60 seconds, and preferably 2.5 to 20 seconds.

Figure 17:
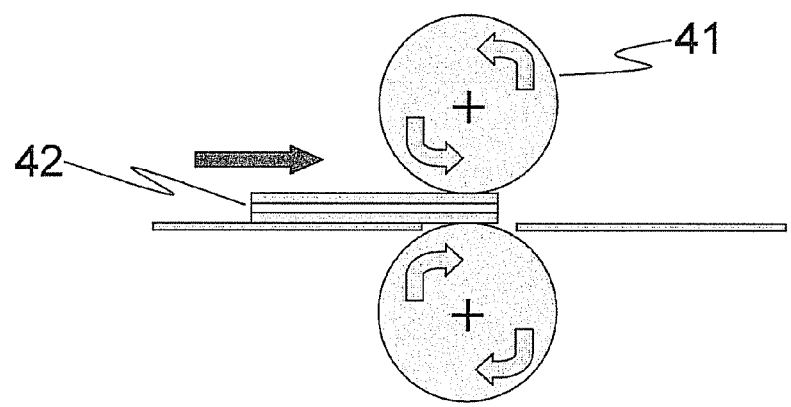
FIG. 17 is a schematic view illustrating the principle of a roll press.
Figure 18:
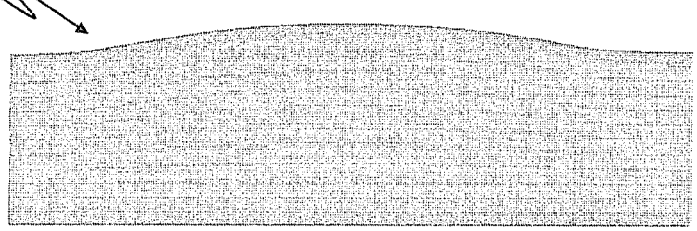
FIG. 18 is a schematic view illustrating a state where a laminated glass is distorted with a non-uniform thickness.

In process (6), the preliminarily adhered translucent rigid substrates are roll-pressed. FIG. 17 illustrates the principle of a roll press. The roll press has at least a pair of rolls 41 installed upward and downward, and a substrate 42 interposed between the rolls 41 is sent out forward by the revolution of the rolls. During this time, pressure is applied upward and downward on the substrate 42. Since the substrates are preliminarily adhered, the risk of misalignment during the passage of the roll press is decreased while fluidity is maintained due to the fixing agent not being cured. Accordingly, the fixing agent moderately flows by passing the preliminarily adhered translucent rigid substrates through the roll press, and the uniformity of the thickness is improved. In view of the fact that the substrates are bonded in parallel during the preliminary adhesion, the uniformity of the thickness of the fixing agent is improved compared to the case where roll pressing is performed without preliminary adhesion. Excess amount of the fixing agent is squeezed out from the outer boundary of the substrate. Even when bubbles are generated between substrates during the preliminary adhesion, they can be pulled out while the substrate is passing through the press machine.

Even when a provisional fastening is performed in process (5'), the cured fixing agent is present only on the outer boundary, and thus the adhesive power is weak and a cured portion may be collapsed by the roll press. When the collapse does not occur properly, light irradiation in process (5') may not be performed uniformly on the entire outer boundary of the substrate, but light irradiation to the outer boundary may be intermittently performed. As a result, the fixing agent on the outer boundary of the substrate is divided into an uncured portion and a cured portion, and the collapse of the cured portion easily occurs beginning from the uncured portion.

The apparatus for roll pressing is known per se in the art, and it is thought that the detailed description thereof is not necessary. However, in the present invention, it is preferable that an operating condition is set in consideration of the following matters. First, it is preferable that rolls are longer than the width of the translucent rigid substrate. This is because when a plurality of short rolls is arranged in an axis direction, a gap between the rolls is generated and it is difficult to apply a uniform pressure over the width direction of the substrate. Further, a pair of rolls is disposed such that the bonded substrates are sandwiched by upper and lower rollers. In case where only one pair of rolls is present, the substrate is easily warped, and thus it is preferable that two or more pairs (for example, two pairs, three pairs, or four pairs) are installed in a substrate-passing direction. In view of preventing the substrate from being warped upward, it is preferable that the roll is not heated.

If roll pressure is too high, the substrate is broken, the granular material in the fixing agent is squashed, and as a result, a desired thickness may not be obtained. On the other hand, if roll pressure is too low, not only a desired thickness may not be obtained but also bubbles may not be removed. It is preferable to appropriately control roll pressure such that bubbles are removed and a desired thickness may be obtained. For example, a roll press machine may be operated such that the line pressure of the roll is 0.1 to 10 kN/m and typically 0.2 to 5 kN/m. The clearance between upper and lower rollers may be changed according to the number of bonded substrates.

If the rate of conveying the translucent rigid substrates is too fast, bubbles may not be removed and a desired thickness may not be obtained. On the other hand, if the rate is too slow, productivity deteriorates, and thus it is preferable that the rate of conveying the roll is appropriately controlled. For example, the roll press machine may be operated at a conveying rate of 100 to 800 mm/min and typically 150 to 700 mm/min.

A material for rolls is not particularly limited, but silicone, urethane rubber and the like are preferable because those materials do not damage the substrate, are not dissolved by an excess fixing agent which has spilled over, and a desired thickness may be obtained.

After roll-pressing, in process (7), light for curing the entire fixing agent interposed and spreading between both translucent rigid substrates is irradiated to form a translucent rigid substrate laminate. Both translucent rigid substrates can be bonded with a strong force by irradiating light to the entire fixing agent, and a function of preventing the misalignment of the translucent rigid substrates during lamination may be performed.

A wavelength of light irradiated may be appropriately changed according to a property of the used fixing agent, and for example, microwaves, infrared rays, visible rays, UV rays, X-rays, γ-rays, electron beams and the like may be irradiated. Generally, irradiation light is UV rays because UV rays may be simply used and has relatively high energy.

Therefore, in the present invention, light refers not only to visible rays but also to electromagnetic waves (energy rays) covering a wide wavelength region. As a light source, for example, a black light, a high-pressure mercury lamp, an LED light and a metal halide lamp may be used.

The irradiation amount of light irradiated is measured by a cumulative illuminometer using a light receptor of 365 nm, and the amount may be generally 1,000 to 5,000 $mJ/cm^2$, typically 1,200 to 4,500 $mJ/cm^2$, more typically 1,400 to 4,000 $mJ/cm^2$, and preferably 1,500 to 3,500 $mJ/cm^2$. The irradiation time is generally 0.1 to 120 seconds, typically 15 to 75 seconds, and more typically 20 to 60 seconds.

Figure 2:
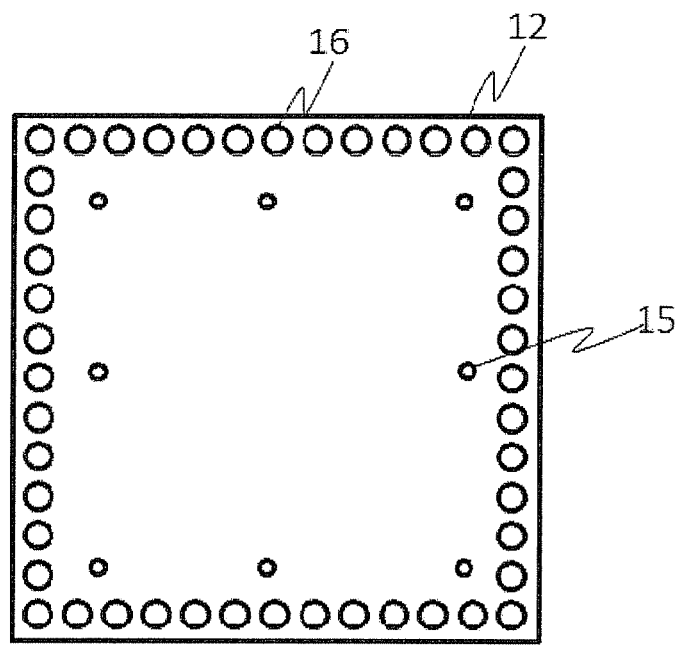
FIG. 2 is a schematic view illustrating an example of a lower surface of an upper stage.

In process (7), since light having energy that is relatively high in intensity should be irradiated because the entire fixing agent is cured, it is required that an irradiation device considering the safety of a worker is used. In the case where such an irradiation device is not present in the vicinity of a roll press machine or the case where there is a waiting time until irradiation, it is considered that the translucent rigid substrate is transferred to the irradiation device or stored in a predetermined storage place. In such a case, it is required that misalignment of the substrates during transfer or leakage of the fixing agent during storage is prevented. Therefore, a process (6') of forming a provisionally fastened translucent rigid substrate laminate by irradiating light for curing only the outer boundary portion of the fixing agent interposed and spreading between the both translucent rigid substrates or irradiating light having energy that is lower than energy of process (7) on the entire fixing agent may be performed between processes (6) and (7). The process (6') may be performed under the same conditions as process (5'), except that pressure is not applied. The process (6') may be performed alternatively with process (5'). Before process (6') is performed, it is preferable that the position adjustment of the preliminarily adhered translucent rigid substrate in a surface direction is performed while imaging a mark for alignment attached to the surface of the substrate by an imaging device. Examples of the method for performing the position adjustment in this case include, as illustrated in FIG. 16-2, a method including: installing an imaging device 30 on a second surface side of a first translucent rigid substrate 31 and on a second surface side of a second translucent rigid substrate 32, and moving the second translucent rigid substrate 32 by hand while imaging the mark by the imaging device 30. The first translucent rigid substrate 31 may be adsorbed on a stage 35 by adsorption holes 33. Hole 34 for imaging may be provided in the stage 35, if necessary.

Process (7) may be performed in a batch process by fixing the irradiation source of light, but an angle of incidence of light irradiated is constant in that case. In particular, in the case where a printing pattern and the like are attached to the surface of the rigid substrate, the printing pattern prevents light from reaching the fixing agent present on the other surface side thereof. However, even though there is a site of the fixing agent where it is difficult for light to reach from a certain direction, it becomes easy for the light to reach the site by changing the angle of incidence of light irradiated. Therefore, in an embodiment of the present invention, light may be irradiated while the angle of incidence is changed in process (7). Examples of the method for changing the angle of incidence include a method for moving an irradiation source, a method for moving a substrate, and the like, but for example, it is considered to perform process (7) while the translucent rigid substrate laminate is conveyed by a conveyor.

Since irradiated light is absorbed on the fixing agent, if the lamination number is increased, it is difficult to cure the fixing agent on a layer that is present apart from an irradiation source. Further, if the irradiation direction of light is randomly determined, an irradiation history of light received on the fixing agent in the translucent rigid substrate laminate is fluctuated, and the degree of curing of the fixing agent between the layers or on the same layer is changed. This is because the fixing agent is cured by irradiation of light, but is gradually softened as the amount of light irradiated is increased. In this case, there is a concern that the translucent rigid substrate may not be laminated in a constant thickness and may be laminated in a distortion state due to difference in curing distortion.

Therefore, it is desired to uniformalize irradiation history of light to the fixing agent existing between the layers of the translucent rigid substrate laminate. Examples of a method for reducing the non-uniformity include a method for constantly irradiating light on a side of a newly bonded translucent rigid substrate. In other words, in process (7) or (6'), light is irradiated to the surface of the second translucent rigid substrate. Processes (7) and (6') include process (7) and optional process (6') which are repeated by process (8).

It is possible to further reduce the non-uniformity by adjusting the intensity of light irradiated. For example, it is considered that the relationship between the intensity of light to be irradiated and the thickness of the fixing agent is set so that the light does not pass through a new bonding surface on which an uncured fixing agent exists. For specific conditions, when measured by the cumulative illuminometer using the light receptor of 365 nm, the intensity of light is 100 $mW/cm^2$ or less and in consideration of productivity it is 10 to 100 $mW/cm^2$, and preferably 50 to 100 $mW/cm^2$. The thickness of the fixing agent is 75 µm or more. In view of prevention of dimensional misalignment while the translucent rigid substrate laminate is processed it is 75 to 120 µm, and preferably 75 to 110 µm. Thus, since the light is hardly further irradiated to the fixing agent that is present on the existing bonding surface, the fixing agents present on all bonding surfaces have substantially the same irradiation history.

In process (8), a series of processes (1) to (7) are repeated at least one time by regarding the translucent rigid substrate laminate obtained in process (7) as the first translucent rigid substrate. Accordingly, the translucent rigid substrate laminate where at least three translucent rigid substrates are bonded may be obtained. In view of improvement in production efficiency of the plate-shaped product, it is preferable to manufacture the translucent rigid substrate laminate where 10 or more translucent rigid substrates and typically 10 to 30 translucent rigid substrates are laminated. The translucent rigid substrates are strongly adhered by curing the fixing agent every time the translucent rigid substrates are bonded. Accordingly, the misalignment problem as described in Patent Literature 1 does not occur even though the number of laminations is increased.

<Manufacturing of the Plate-Shaped Product>

A plate-shaped product may be manufactured by using a translucent rigid substrate laminate obtained by the method for manufacturing the translucent rigid substrate laminate described above.

First, in process (9), the translucent rigid substrate laminate is divided in a thickness direction, and the divided translucent rigid substrate laminates are formed in a desired number. The division method is not particularly limited, but examples thereof may include a method for performing division in a rectangular parallelepiped form having the same size by using a disk cutter (diamond disk and cemented carbide disk), a fixed abrasive type or loose abrasive type wire saw, a laser beam, etching (for example: chemical etching or electrolytic etching using hydrofluoric acid, sulfuric acid or the like), and red heat zone (a nichrome wire) alone or in combination thereof. The etching may be used in surface treatment of a cut surface after the division.

Next, in process (10), desired shape processing is performed on each of the divided translucent rigid substrate laminates. In this process, since each of the divided translucent rigid substrate laminates may be integrally processed in a form of a targeted plate-shaped product, there is an advantage in that a production speed of the plate-shaped product may be significantly increased. The shape processing may be performed by any known means, and examples thereof may include grinding by a rotation whetstone, holing by an ultrasonic wave vibration drill, edge face processing by a rotation brush, holing by etching, edge face processing by etching, external shape processing by etching, flame processing using a burner and the like. The processing method may be used alone or in combination. The etching may be used in surface treatment after the shape processing.

In process (11), the bonded translucent rigid substrates are delaminated, and a plurality of plate-shaped products is formed by heating the translucent rigid substrate laminate after the shape processing. The heating method is not particularly limited, but since the fixing agent is softened in a film form and smoothly separated from each plate-shaped product, a method for immersing the translucent rigid substrate laminate after the shape processing in warm water is preferable. The appropriate temperature of warm water depends on the adopted fixing agent, but generally about 60 to 95° C. and preferably 80 to 90° C.

When a predetermined printing pattern and/or plating pattern for exhibiting any one of the functions of a plate-shaped product is attached to the surface of each translucent rigid substrate, it is difficult to cure the fixing agent which is present on the opposite surface side of these patterns as compared to a point which is not blocked by these patterns. Accordingly, a process of irradiating light for curing an uncured fixing agent toward the side surface of the divided translucent rigid substrate laminate may be provided between processes (9) and (11). Light is irradiated toward the side surface, and thus it is advantageous in curing an fixing agent inside the laminate.

The irradiation amount of light irradiated is measured by a cumulative illuminometer using a light receptor of 365 nm, and the amount may be generally 1,000 to 15,000 mJ/cm$^2$, typically 1,500 to 10,000 mJ/cm$^2$, more typically 2,000 to 9,000 mJ/cm$^2$, and preferably 4,000 to 8,000 mJ/cm$^2$ for one side surface of the translucent rigid substrate laminate. The irradiation time is generally around 0.1 to 120 seconds, typically around 15 to 75 seconds, and more typically around 20 to 60 seconds.

As a light source, for example, a black light, a high-pressure mercury lamp, an LED light, a metal halide lamp and the like may be used. Since a high-pressure mercury lamp or a metal halide lamp has high intensity of irradiation, an advanced effect may be expected.

Constitution Example of the Apparatus

An example of the translucent rigid substrate bonding apparatus which may be used when the translucent rigid substrates are preliminarily adhered to each other will be described.

FIG. 1 is a schematic view illustrating a first example of a translucent rigid substrate bonding apparatus according to the present invention. A translucent rigid substrate bonding apparatus 10 includes a rack 11, an upper stage 12, a press unit 13, an suction unit 14, an suction hole 15, an LED unit 16, a lower stage 17, a lower stage moving means 18, a side clamp 19, a coating unit for a lower substrate 20, a coating unit for an upper substrate 21, an imaging unit 22, and an electric component unit 23.

In the present embodiment, the LED unit 16 for performing provisional fastening by UV irradiation to the outer boundary of the substrate is included. In embodiments in which provisional fastening is not performed, the LED unit 16 is not necessary.

The rack 11 is a base portion on which each constitution component of the translucent rigid substrate bonding apparatus 10 is mounted, and the electric component unit 23 is disposed therein. The electric component unit 23 performs sequence control of the constitution components by a programmable logic controller (PLC).

The upper stage 12 holds a translucent rigid substrate 25 of the upper side by vacuum adsorption. Accordingly, a plurality of suction holes 15 are formed in a lower surface of the upper stage 12, and the suction holes 15 are connected to the suction unit 14 through pipes. FIG. 2 is a schematic view of the lower surface of the upper stage 12, and illustrates a disposal example of the suction holes 15. A vacuum pump, a vacuum ejector and the like may be used as the suction unit 14.

The press unit 13 for bonding the substrates while pressing the translucent rigid substrate 25 of the upper side to the translucent rigid substrate 24 of the lower side is connected to the upper portion of the upper stage 12. The press unit 13 has an elevating cylinder (not shown) that may move the upper stage 12 in a Z direction (vertical direction), and may control pressing force, a moving speed, a pressing time and a height thereof by a servo motor.

A plurality of LED units 16 for irradiating UV to the lower side translucent rigid substrate 24 in order to cure the fixing agent is buried in the lower surface of the upper stage 12. The LED units 16 are disposed so as to be along the outer boundary of the upper translucent rigid substrate 25 adsorbed on the upper stage 12. FIG. 2 illustrates an example of disposing state of the LED units 16. The width of the outer boundary portion to be irradiated may be increased by disposing the LED units 16 not only in one row but in two or more rows in parallel. It is possible to adjust the range of a portion in which the fixing agent is not cured by adjusting the disposing interval of the LED units 16.

The lower stage 17 holds the translucent rigid substrate 24 of the lower side and, at the same time, receives pressure from the upper stage 12 during pressing. The lower stage 17 may be moved in an X-axis direction, a Y-axis direction and a 0-axis direction by the lower stage moving means 18. The lower stage moving means 18 is constituted by a 0 table enabling slewing motion in a horizontal direction and an X table and a Y table enabling horizontal movement. The tables are driven by a motor. The side clamp 19 that is driven by the motor and may be moved in the X-axis direction and the Y-axis direction to determine the position of the mounted translucent rigid substrate is provided on the upper surface of the lower stage 17. A position determination stopper for mounting the translucent rigid substrate at a target position may be provided instead of the side clamp 19 on the upper surface of the lower stage 17. In this case, the translucent rigid substrate is manually mounted at a position at which the translucent rigid substrate is fixed by the stopper. Further, in order to prevent misalignment of the translucent rigid substrate, like the upper stage 12, the translucent rigid substrate 24 of the lower side may be held by vacuum adsorption.

The coating unit for the lower substrate 20 includes a dispenser 20$a$ of the photo-curable fixing agent and a robot 20$b$ that is connected thereto, may be moved in X-, Y- and Z-axis directions, and is driven by the motor, and the fixing agent may be applied in any pattern to the upper surface of the translucent rigid substrate 24 of the lower side. The fixing agent is filled in a syringe, and automatically and quantitatively discharged. The coating amount is controlled by a digital pressure meter and a coating speed.

The coating unit for the upper substrate 21 automatically applies the photo-curable fixing agent on the lower surface of the translucent rigid substrate 25 of the upper side while the translucent rigid substrate 25 of the upper side is held on the upper stage 12. The coating amount is controlled by a pressure gauge and a coating time. The coating unit for the upper substrate 21 includes a robot 21b that has a rotation shaft rotatable in a horizontal direction beside the upper and lower stages and is driven by a motor, a rotary nozzle 21a at an end thereof is disposed below around the center of the upper stage 12 during coating, and the fixing agent is applied from the tip of the nozzle 21a. If the coating is finished, the coating unit for the upper substrate 21 is stored beside the upper and lower stages so as not to disturb bonding of the translucent rigid substrate.

The imaging unit 22 images an alignment mark for position adjustment installed on each surface of the translucent rigid substrate 25 of the upper side and the translucent rigid substrate 24 of the lower side by digital cameras 22a attached to upper and lower two portions at an end of an arm. The electric component unit 23 detects a relative misalignment state of the translucent rigid substrate 25 of the upper side and the translucent rigid substrate 24 of the lower side based on the obtained image information. Operations of slightly adjusting the position of the lower stage 17 in the X-axis direction, the Y-axis direction and the θ-axis direction by the lower stage moving means 18 and amending the misalignment are performed based on the detection result. After the amendment of the misalignment, both translucent rigid substrates are bonded. An analogue camera may also be used as the camera in addition to the digital camera using CCD or CMOS as the imaging element, but it is preferable to use the digital camera in view of high resolution. In the present embodiment, the imaging device images each bonding surface of the translucent rigid substrate of the upper side and the translucent rigid substrate of the lower side, but the imaging device may be changed in the disposition as shown in FIG. 16-1.

The imaging unit 22 includes a moving means 22b driven by a motor in X- and Y-axis directions, and the digital camera 22a is moved to a target position at which the alignment mark is clearly viewed when imaging is performed. If the imaging is finished, the digital camera 22a is moved so as not to disturb the translucent rigid substrates from being bonded.

The procedure of bonding of the translucent rigid substrates using the translucent rigid substrate bonding apparatus 10 according to the first example will be described with reference to FIGS. 3 to 14.

Figure 3:
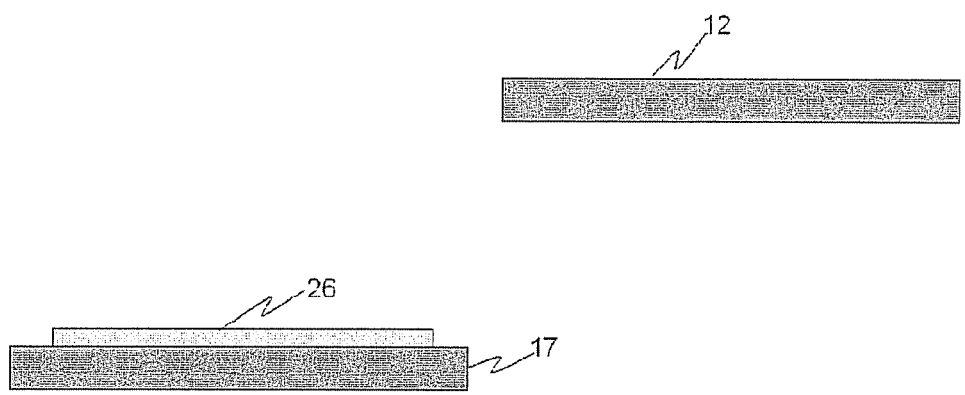
FIG. 3 is a view illustrating a state where a first substrate is mounted on a lower stage.
Figure 4:
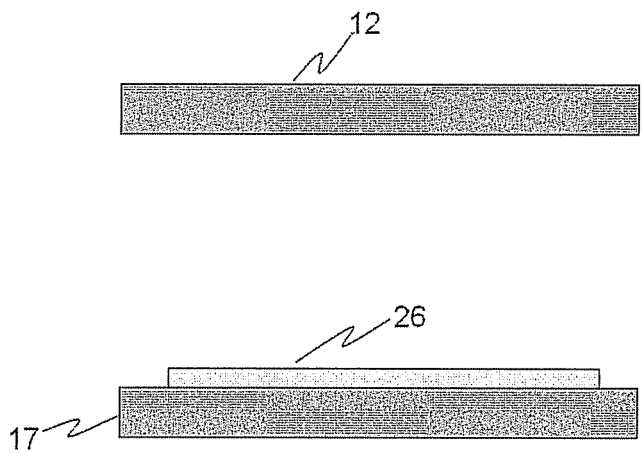
FIG. 4 is a view illustrating a state where the first substrate mounted on the lower stage is conveyed directly below the upper stage.
Figure 5:
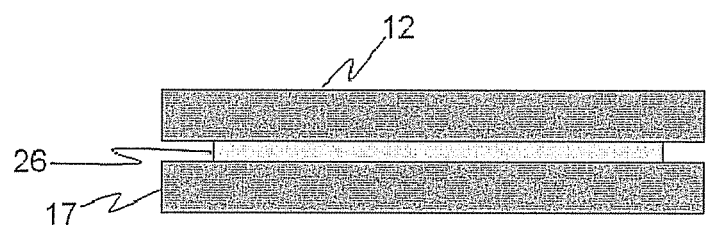
FIG. 5 is a view illustrating a state where the upper stage is lowered to vacuum-adsorb the first substrate.

First, the first translucent rigid substrate 26 is mounted on the lower stage 17, and fixed at a target position by the side clamp 19 (not shown) (FIG. 3). The mounting of the translucent rigid substrate 26 on the lower stage 17 may be manually performed, but a plurality of translucent rigid substrates 26 may be housed in an exclusive cassette and automatically mounted on the lower stage 17. The mounted translucent rigid substrate 26 is moved directly below the upper stage 12 by the lower stage moving means 18 (not shown) (FIG. 4). Subsequently, the upper stage 12 is lowered by the press unit 13. The translucent rigid substrate 26 is vacuum-adsorbed by suction force from the suction holes 15 (not shown) (FIG. 5).

Figure 6:
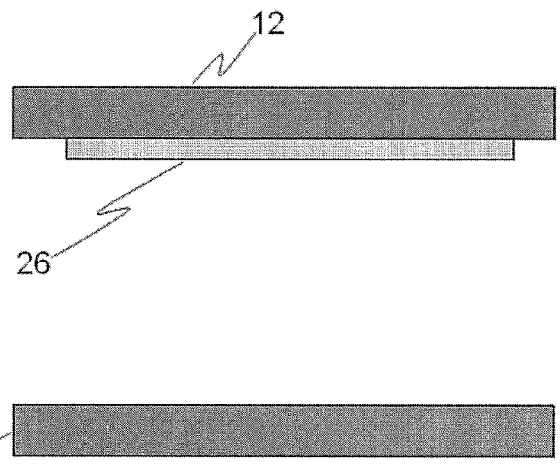
FIG. 6 is a view illustrating a state where the upper stage is raised while the adsorbed first substrate is held.

The adsorbed translucent rigid substrate 26 is held and is raised together with the upper stage 12, and waits for the second substrate (FIG. 6).

Figure 7:
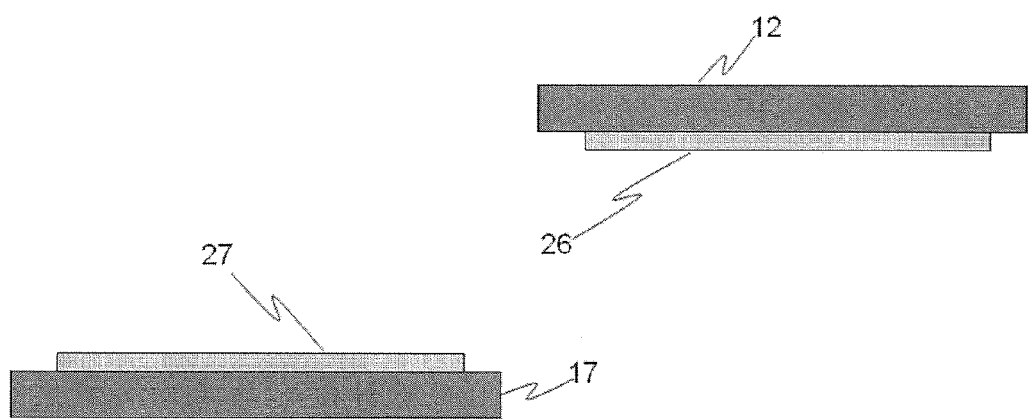
FIG. 7 is a view illustrating a state where a second substrate is mounted on the lower stage.
Figure 8:
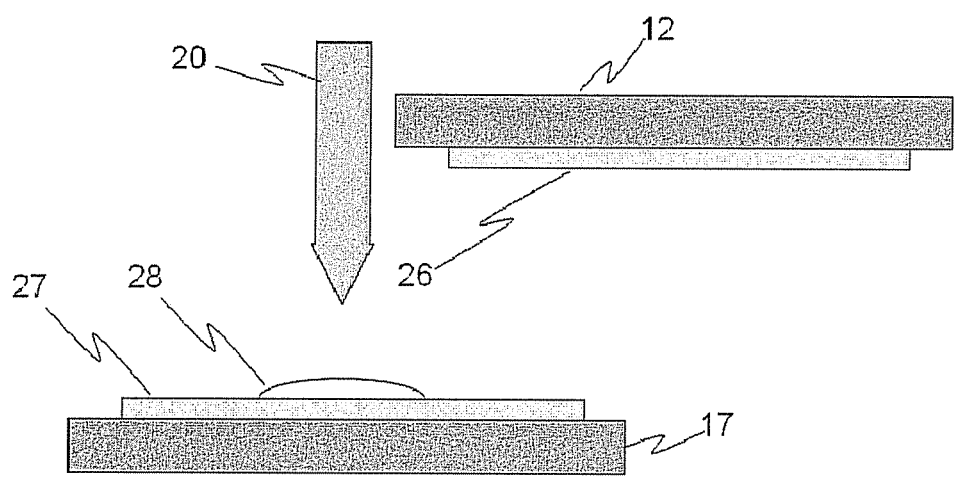
FIG. 8 is a view illustrating a state where a fixing agent is applied to an upper surface of the second substrate.
Figure 9:
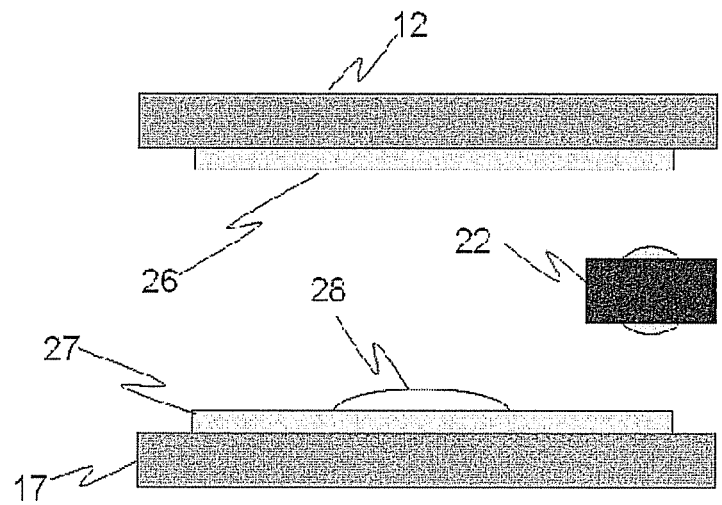
FIG. 9 is a view illustrating a state where the second substrate mounted on the lower stage is conveyed directly below the upper stage, and an alignment mark attached to the surfaces of both substrates is imaged by a camera.

Next, the second translucent rigid substrate 27 is mounted on the lower stage 17, and fixed at a target position by the side clamp 19 (not shown) (FIG. 7). The fixing agent 28 is applied in a predetermined pattern from the coating unit for the lower substrate 20 to the upper surface of the second translucent rigid substrate 27 (FIG. 8). After the coating is completed, if the second translucent rigid substrate 27 mounted on the lower stage 17 is moved directly below the upper stage 12, the alignment mark is imaged by the camera attached to the end of the arm of the imaging unit 22, and the position of the lower stage 17 is slightly adjusted according to the imaging result for positional adjustment of both translucent rigid substrates 26 and 27 (FIG. 9).

Figure 10:
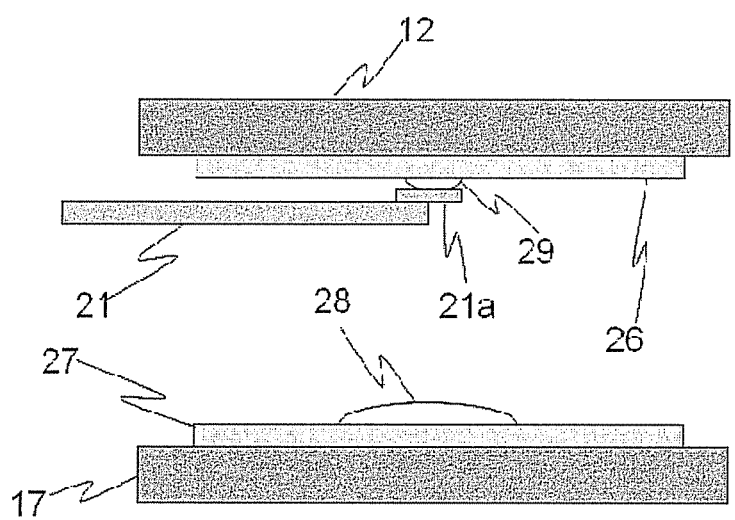
FIG. 10 is a view illustrating a state where the fixing agent is applied to the lower surface of the first substrate held on the upper stage.
Figure 11:
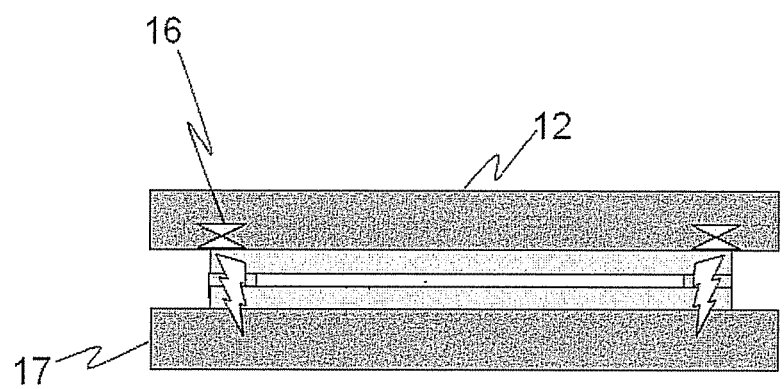
FIG. 11 is a view illustrating a state where the upper stage is lowered to bond two substrates, and UV is irradiated to the outer boundary portion of the substrate.

After the positional adjustment, the nozzle 21a attached to the end of the arm of the coating unit for the upper substrate 21 is moved around the center of the first substrate 26 held on the upper stage 12, and the fixing agent 29 is applied from the nozzle 21a to the lower surface of the first translucent rigid substrate 26 (FIG. 10). After the fixing agents 28 and 29 are applied to the translucent rigid substrates 26 and 27 of the upper side and the lower side, if the upper stage 12 is lowered by the press unit 13 and two translucent rigid substrates 26 and 27 are bonded by pressing, the fixing agents 28 and 29 interposed between the translucent rigid substrates of the upper side and the lower side spread on the entire surface of the translucent rigid substrate by pressing. While the pressing state is maintained. UV rays are irradiated from the LED unit 16 to the outer boundary portion of the translucent rigid substrate (FIG. 11). Accordingly, only the fixing agent present on the outer boundary portion is cured.

Figure 12:
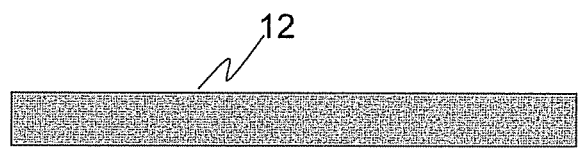
FIG. 12 is a view illustrating a state where the upper stage is raised after irradiation of UV.
Figure 12:
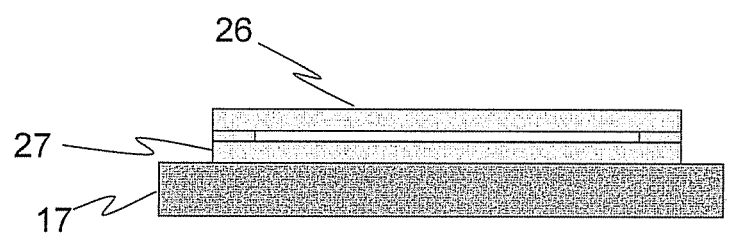
Figure 13:
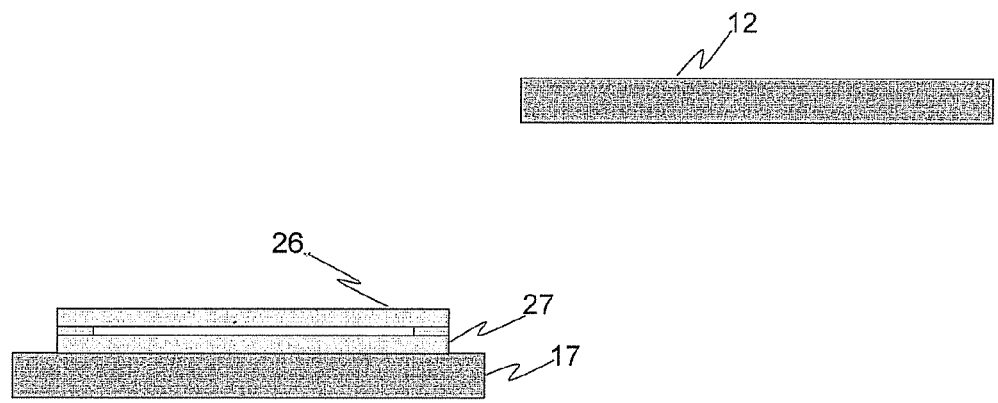
FIG. 13 is a view illustrating a state where the bonded substrates are conveyed by the lower stage and returned to the original position.

After UV rays are irradiated, adsorption to the substrate 26 of the upper side is removed, and only the upper stage 12 is raised (FIG. 12). The bonded translucent rigid substrates are conveyed back to the original position by the lower stage 17 (FIG. 13). The preliminary adhesion of the translucent rigid substrates is completed by the aforementioned process.

Thereafter, the provisionally fastened translucent rigid substrate laminate is allowed to pass through a roll press machine, and subsequently, a translucent rigid substrate laminate may be formed by irradiating light for curing the entire fixing agent. A laminate where a plurality of translucent rigid substrates is bonded is manufactured by repeating this sequence.

Figure 14:
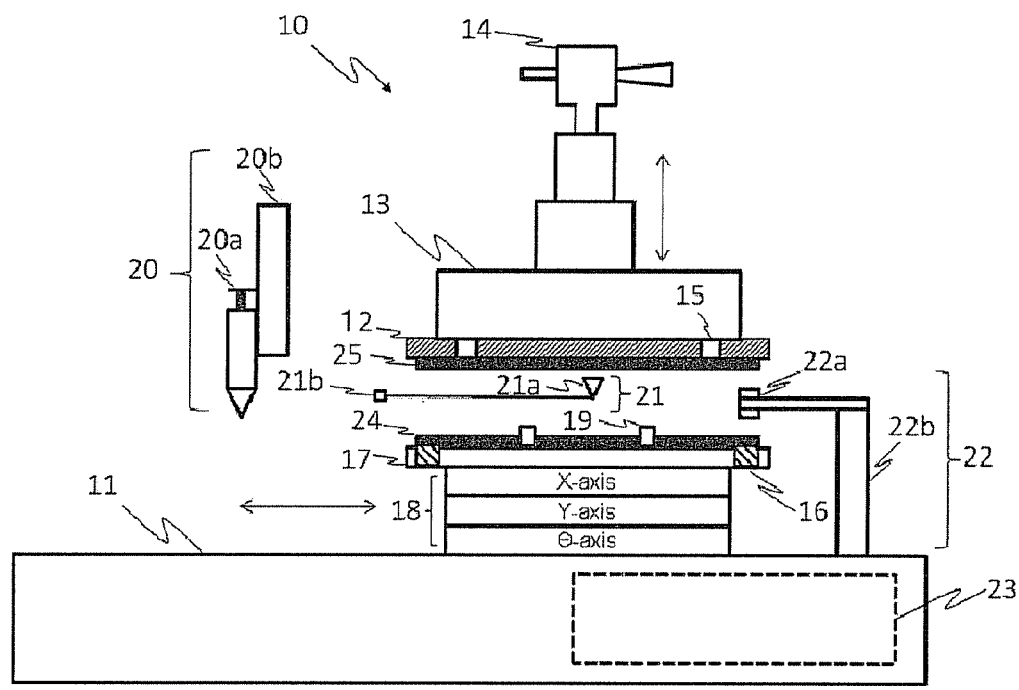
FIG. 14 is a schematic view illustrating a second example of the substrate bonding apparatus for preliminarily adhering translucent rigid substrates to each other.

FIG. 14 is a schematic view illustrating a second embodiment of a translucent rigid substrate bonding apparatus according to the present invention. In the present embodiment, the LED units 16 are disposed on the upper surface of the lower stage 17 along the outer boundary of the translucent rigid substrate 24 of the lower side and irradiate UV rays in an upper direction.

Figure 15:
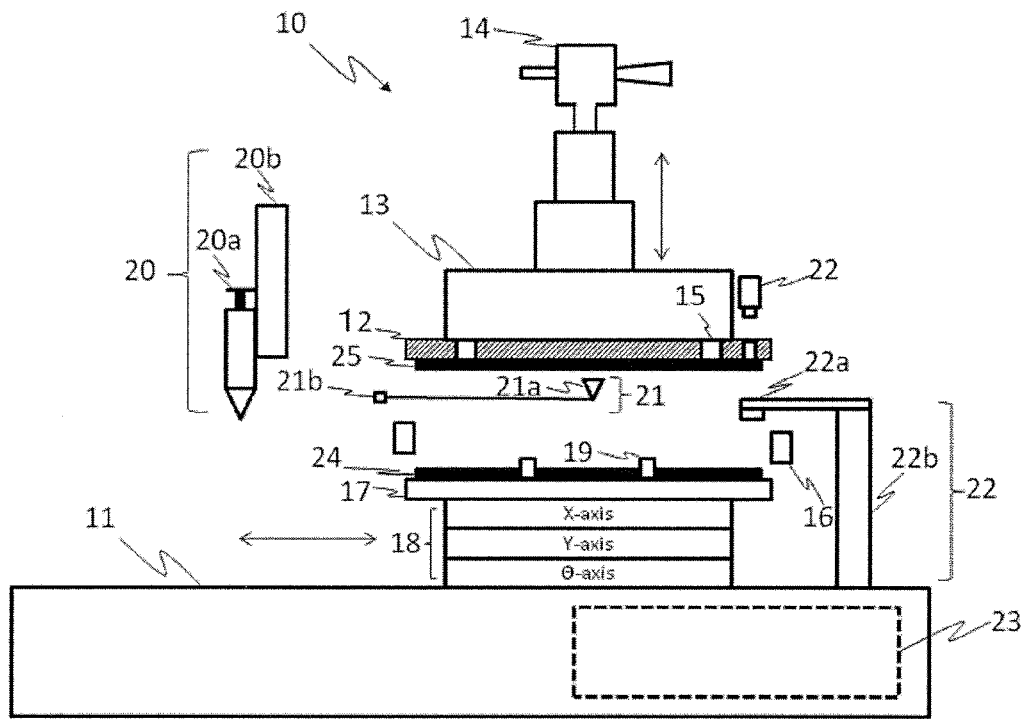
FIG. 15 is a schematic view illustrating a third example of the substrate bonding apparatus for preliminarily adhering translucent rigid substrates to each other.

FIG. 15 is a schematic view illustrating a third embodiment of a translucent rigid substrate bonding apparatus according to the present invention. The LED units 16 are disposed so as to surround the side surface of the outer boundary of both translucent rigid substrates to be bonded, and irradiate UV rays toward the side surface of the outer boundary. The LED units 16 have a moving means in the Z-axis direction, and are movable to an appropriate height according the height of the bonding surface. Further, the disposition of the imaging unit 22 is changed.

As described above, embodiments of the present invention have been described with reference to the drawings, but the present invention is not limited to these embodiments, and various variations are possible.

EXAMPLES

Inventive Example

1. Preparation of the Fixing Agent

The fixing agent was prepared by mixing the following components (A) to (D). Two kinds of fixing agents were prepared.
(Fixing Agent 1)

(A) As the polyfunctional (meth)acrylates, 20 parts by mass of "UV-3000B" manufactured by The Nippon Synthetic Chemical Industry Co., Ltd. (urethaneacrylate, hereinafter abbreviated as "UV-3000B") and 15 parts by mass of dicyclopentany) diacrylate ("KAYARAD R-684" manufactured by Nippon Kayaku Co., Ltd., hereinafter abbreviated as "R-684"), (B) as the monofunctional (meth)acrylates, 40 parts by mass of 2-(1,2-cyclohexacarboxyimide)ethyl acrylate ("ARONIX M-140" manufactured by TOAGOSEI CO., LTD., hereinafter abbreviated as "M-140") and 25 parts by mass of phenol 2 mol ethylene oxide-modified acrylate ("ARONIX K8-101A" manufactured by TOAGOSEI CO., LTD.), (C) as the photopolymerization initiator, 5 parts by mass of BDK: benzyldimethylketal ("IRGACURE651" manufactured by BASF Co., Ltd.), and (D) as the granular material which is not dissolved in (A) to (C), 1 part by mass of spherical crosslinked polystyrene particles with an average particle size (D50) of 102.6 μm ("GS-100S" manufactured by GANZ CHEMICAL CO., LTD.)
(Fixing Agent 2)

(A) As the polyfunctional (meth)acrylates, 20 parts by mass of "UV-3000B" manufactured by The Nippon Synthetic Chemical Industry Co., Ltd. (urethaneacrylate, hereinafter abbreviated as "UV-3000B") and 15 parts by mass of dicyclopentanyl diacrylate ("KAYARAD R-684" manufactured by Nippon Kayaku Co., Ltd., hereinafter abbreviated as "R-684"), (B) as the monofunctional (meth)acrylates, 40 parts by mass of 2-hydroxy-3-phenoxypropyl acrylate ("ARONIX M-5700" manufactured by TOAGOSEI CO., LTD., hereinafter abbreviated as "M-5700") and 25 parts by mass of phenol 2 mol ethylene oxide-modified acrylate ("ARONIX M-101A" manufactured by TOAGOSEI CO., LTD.), (C) as the photopolymerization initiator, 5 parts by mass of BDK: benzyldimethylketal ("IRGACURE651" manufactured by BASF Co., Ltd.), and (D) as the granular material which is not dissolved in (A) to (C), 1 part by mass of spherical crosslinked polystyrene particles with an average particle size (D50) of 102.6 μm ("GS-100S" manufactured by GANZ CHEMICAL CO., LTD.)

2. Bonding of the Translucent Rigid Substrates

As the translucent rigid substrate, the plate glasses attached with a mark for alignment (plate glasses having the dimension of 530 mm width, 420 mm length, and 0.7 mm thickness) were preliminarily adhered to each other by using a bonding apparatus having the constitution of FIG. 1 as previously described. However, the imaging device for alignment is disposed as shown in FIG. 16-1. The operating conditions of the apparatus are as follows.

Operating Conditions of the Bonding Apparatus

Bonding pressure: 400 g/cm$^2$
Bonding time: 180 seconds
The amount of the fixing agent applied to the upper side plate glass: 5 g
The amount of the fixing agent applied to the lower side plate glass: 33 g
The UV irradiation amount for provisional fastening: 20 mJ/cm$^2$ (measured by a cumulative illuminometer using a light receptor of 365 nm)
UV irradiation time for provisional fastening: 3 seconds
The width of the outer boundary portion on which UV is irradiated: 7 mm
UV light source: LED light
Line pressure: 0.5 kN/m
Roll width: 1 m
Conveying rate: 200 mm/min
Roll material: Silicone

4. Curing of the Fixing Agent

UV irradiation was performed on the entire surface of the plate glass after the roll-pressing. The irradiation conditions are as follows.
UV irradiation amount: 2,800 mJ/cm$^2$ (measured by a cumulative illuminometer using a light receptor of 365 nm)
The UV irradiation time: 40 seconds
UV light source: Metal halide lamp

5. Repetition of Laminations 10 plate glasses were laminated by repeating processes 2 to 4 described above.

Comparative Example 10 plate glasses were laminated in the same sequence as in the Inventive Examples, except that the alignment is manually performed by using the disposition of the imaging device as shown in FIG. 16-2 after the fixing agent was applied in the same amount as in the Inventive Examples on the upper and lower plate glasses and the plate glasses were manually bonded without performing preliminarily adhesion.

Measurement of Flatness

With respect to the plate glass laminate obtained as described above, flatness was measured by a three-dimensional coordinate measuring machine ("SVA600A" manufactured by TOKYO SEIMITSU CO., LTD.). 160 points were used as the measuring point. The results are shown in Table 1. It can be seen that higher flatness is obtained in the Inventive Example.

TABLE 1

| | Kind of fixing agent | Average thickness | Maximum thickness | Minimum thickness | Difference in thickness between maximum value and minimum value |
|---|---|---|---|---|---|
| Inventive Example 1 | Fixing agent 1 | 9.740 mm | 9.830 mm | 9.588 mm | 0.242 mm |
| Inventive Example 2 | Fixing agent 2 | 9.750 mm | 9.840 mm | 9.606 mm | 0.234 mm |
| Comparative Example | Fixing agent 1 | 9.435 mm | 10.11 mm | 9.021 mm | 1.089 mm |

Processing and Delamination Test

With respect to Inventive Example 1 and Inventive Example 2, a processing and delamination test was performed.

Processes 9) to 11) were performed on a plate glass laminate formed of 10 plate glasses, which was obtained by the repetition of laminations.

In process 9), a disk cutter (diamond disk) was used and the plate glass laminate was divided into a plurality of rectangular parallelepiped forms (width of 100 mm×length of 55 mm). In process 10), grinding by a rotation whetstone, holing by an ultrasonic wave vibration drill and edge face processing by a rotation brush were sequentially performed for shape processing. In process 11), the plate glass laminate was immersed in warm water at 85° C. to be delaminated.

As a result, with respect to Inventive Example 1 and Inventive Example 2, a plurality of laminates was easily obtained. With respect to Inventive Example 1 and Inventive Example 2, the rectangular parallelepiped forms were uniform.

With respect to Inventive Example 1 and Inventive Example 2, the same desired results were obtained even when the plate glass having the dimension of 530 mm width, 420 mm length, 0.7 mm thickness, to which a plating pattern was attached, was used as the plate glass.

REFERENCE SIGNS LIST

10 Translucent rigid substrate bonding apparatus
11 Rack
12 Upper stage
13 Press unit
14 Suction unit
15 Suction hole
16 LED unit
17 Lower stage
18 Lower stage moving means
19 Side clamp
20 Coating unit for lower substrate
20a Dispenser
20b Robot
21 Coating unit for upper substrate
22 Imaging unit
22a Digital camera
22b Moving means
23 Electric component unit
24 Translucent rigid substrate of lower side
25 Translucent rigid substrate of upper side
26, 27 Translucent rigid substrate
28, 29 Fixing agent
30 Imaging device
31 First translucent rigid substrate
32 Second translucent rigid substrate
33 Adsorption hole
34 Hole for imaging
35 Stage
41 Roll
42 Bonded substrate
51 Distorted glass laminate Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A method for manufacturing a translucent rigid substrate laminate, comprising:
    1) a process of preparing a first translucent rigid substrate,
    2) a process of preparing a second translucent rigid substrate,
    3) a process of applying a photo-curable fixing agent to a first surface of the first translucent rigid substrate and/or a first surface of the second translucent rigid substrate,
    4) a process of placing the first surface of the first translucent rigid substrate and the first surface of the second translucent rigid substrate to face each other such that both surfaces are parallel to each other,
    5) a process of applying pressure to the first surface of the first translucent rigid substrate and the first surface of the second translucent rigid substrate to bond the both translucent rigid substrates while being kept parallel, to preliminarily adhere the both translucent rigid substrates to each other, wherein the fixing agent is kept uncured until after process 5),
    6) a process of roll-pressing the preliminarily adhered translucent rigid substrates,
    7) after process 6) a process of irradiating light for curing the entire fixing agent interposed and spreading between the both translucent rigid substrates to form the translucent rigid substrate laminate, and
    8) a process of repeating a series of processes 1) to 7) at least one time by regarding the translucent rigid substrate laminate as the first translucent rigid substrate to form the translucent rigid substrate laminate where at least three translucent rigid substrates are bonded.

2. The method for manufacturing a translucent rigid substrate laminate according to claim 1, wherein,
    5') a process of forming a provisionally fastened translucent rigid substrate laminate by irradiating light for curing only the outer boundary portion of the fixing agent interposed and spreading between the both translucent rigid substrates while maintaining the pressure is performed between processes (5) and (6), or
    6') a process of forming a provisionally fastened translucent rigid substrate laminate by irradiating light for curing only the outer boundary portion of the fixing agent interposed and spreading between the both translurigid substrates or irradiating light having energy that is lower than energy of process (7) on the entire fixing agent is performed between processes (6) and (7).

3. The method for manufacturing a translucent rigid substrate laminate according to claim 2, wherein a mark for alignment is attached to the surface of each translucent rigid substrate, process (5') is performed, and process 4) or 5) includes performing position adjustment in a surface direction while imaging the mark by an imaging device.

4. The method for manufacturing a translucent rigid substrate laminate according to claim 3, wherein an imaging device for imaging a mark for alignment of the first translucent rigid substrate from a second surface side of the first translucent rigid substrate, and an imaging device for imaging a mark for alignment of the second translucent rigid substrate from a first or second surface side of the second translucent rigid substrate are provided.

5. The method for manufacturing a translucent rigid substrate laminate according to claim 2, wherein a mark for alignment is attached to the surface of each translucent rigid substrate, process (6') is performed, and the method includes performing position adjustment of the preliminarily adhered translucent rigid substrates in a surface direction while imaging the mark by an imaging device between processes (6) and (6').

6. The method for manufacturing a translucent rigid substrate laminate according to claim 1, wherein process (7) is performed by irradiating light on the surface of the second translucent rigid substrate.

7. The method for manufacturing a translucent rigid substrate laminate according to claim 1, wherein a predetermined printing pattern and/or plating pattern for exhibiting any one of the functions of a plate-shaped product is attached to the surface of each translucent rigid substrate.

8. The method for manufacturing a translucent rigid substrate laminate according to claim 1, wherein light is irradiated while changing an angle of incidence in process (7).

9. The method for manufacturing a translucent rigid substrate laminate according to claim 8, wherein process (7) is performed while the translucent rigid substrate laminate is conveyed by a conveyor.

10. The method for manufacturing a translucent rigid substrate laminate according to claim 1, wherein the fixing agent includes a granular material.

11. The method for manufacturing a translucent rigid substrate laminate according to claim 1, wherein the amount of irradiation of light in process (7) is in a range of 1,000 to 5,000 mJ/cm$^2$ when measured by a cumulative illuminometer using a light receptor of 365 nm.

12. The method for manufacturing a translucent rigid substrate laminate according to claim 1, wherein the first and second translucent rigid substrates are each is a plate glass.

13. A method for manufacturing a plate-shaped product, comprising:
   9) a process of dividing the translucent rigid substrate laminate obtained by using the method for manufacturing a translucent rigid substrate laminate according to any one of claims 1 to 9 in a thickness direction to form divided translucent rigid substrate laminates in a desired number,
   10) a process of performing desired shape processing with respect to each of the divided translucent rigid substrate laminates, and
   11) a process of heating the divided translucent rigid substrate laminate after the shape processing to delaminate the bonded translucent rigid substrates from each other and forming a plurality of plate-shaped products.

14. The method for manufacturing a plate-shaped product according to claim 13, wherein a predetermined printing pattern and/or plating pattern for exhibiting any one of the functions of the plate-shaped product is attached to the surface of each translucent rigid substrate, and the method includes irradiating light for curing an uncured fixing agent toward the side surface of the divided translucent rigid substrate laminate between processes (9) and (11).

15. The method for manufacturing a plate-shaped product according to claim 13, wherein process (11) includes immersing the translucent rigid substrate laminate after the shape processing in warm water to soften the fixing agent in a film form.

* * * * *